United States Patent [19]

Halopoff

[11] 4,076,433
[45] Feb. 28, 1978

[54] ATTACHMENT FOR GARAGE DOOR SPRING

[76] Inventor: William Halopoff, 17720 Crusader St., Cerritos, Calif. 90701

[21] Appl. No.: 692,307

[22] Filed: Jun. 3, 1976

[51] Int. Cl.² ................. F16G 15/04; F16B 45/00
[52] U.S. Cl. ..................................... 403/213; 267/74; 85/14; 59/86
[58] Field of Search ............... 267/74, 73, 69; 59/86, 59/93, 85; 403/209, 213, 405; 85/1 H, 7, 8.1

[56] References Cited

U.S. PATENT DOCUMENTS

| 578,211 | 3/1897 | Clark | 59/85 UX |
|---|---|---|---|
| 866,555 | 9/1907 | Alger | 59/93 UX |
| 2,537,405 | 1/1951 | Gilbert | 59/85 |
| 2,620,650 | 12/1952 | Cotti | 59/85 X |
| 2,758,833 | 8/1956 | Harbert | 267/74 |
| 2,878,640 | 3/1959 | Johnson | 59/93 |
| 3,246,464 | 4/1966 | Schommer | 59/85 |
| 3,272,496 | 9/1966 | Halopoff et al. | 267/74 |
| 3,370,841 | 2/1968 | Werner et al. | 267/73 |
| 3,621,651 | 11/1971 | Gillespi | 59/93 X |
| 3,739,432 | 6/1973 | Sander et al. | 59/93 X |

FOREIGN PATENT DOCUMENTS

| 1,006,018 | 1/1952 | France | 59/85 |
|---|---|---|---|
| 26,515 | 2/1908 | Sweden | 59/85 |
| 57,035 | 7/1924 | Sweden | 59/93 |

Primary Examiner—Andrew W. Kundrat

[57] ABSTRACT

An attachment device for the quick and easy attachment of a counterbalance coil spring to an appropriate bracket features a single section of rod bent to provide a shoulder at one end for connection to the bracket and a second shoulder at the other end for the counterbalance spring, the ends being equipped in a manner to permit application of an interlocking retention piece over end sections of the bend rod. In some forms of the invention fasteners applicable to the very endmost part of the rod are employed to lock the retention piece in place.

15 Claims, 21 Drawing Figures

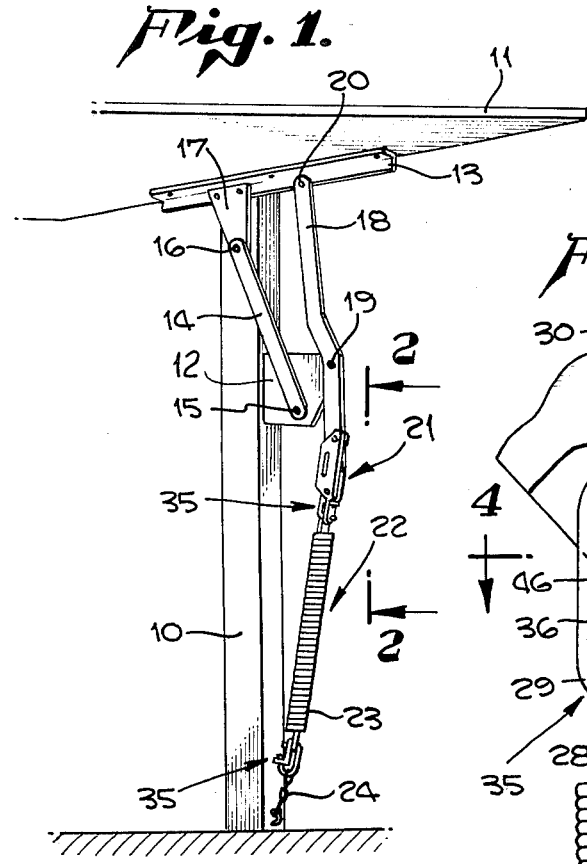
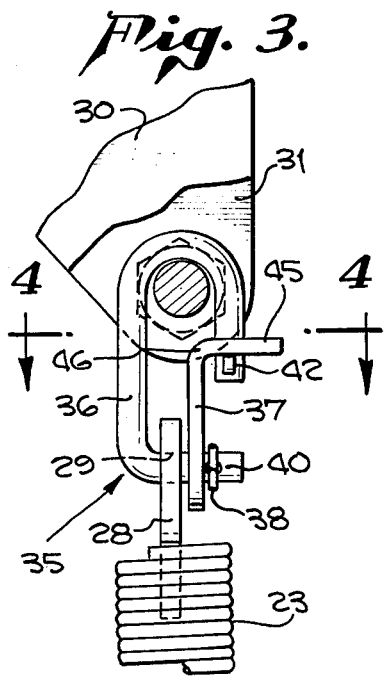
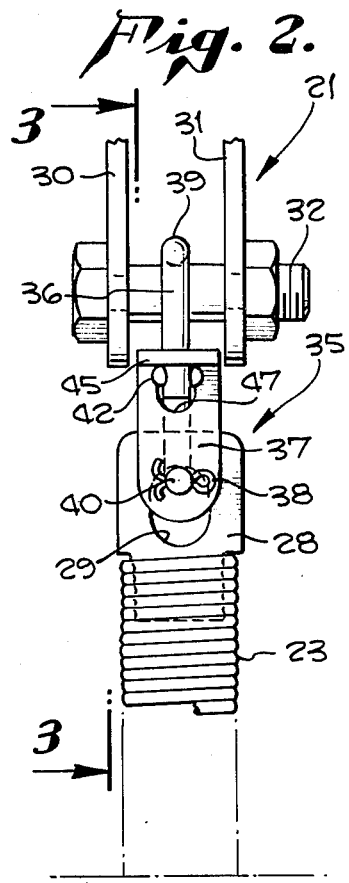
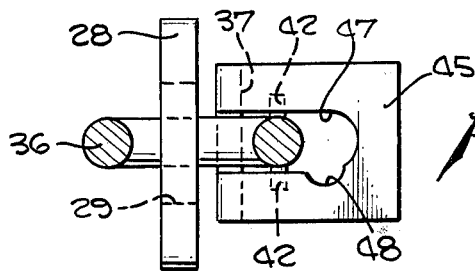
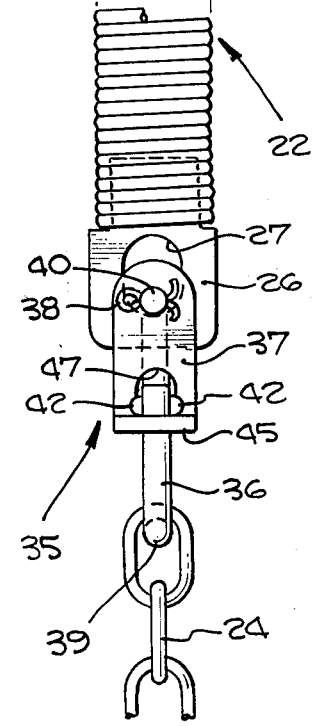
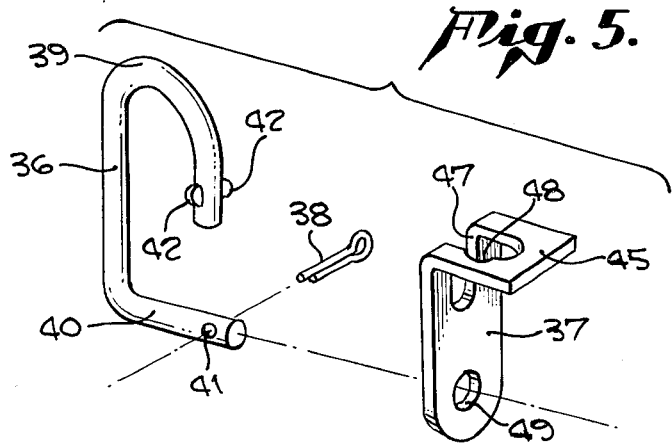

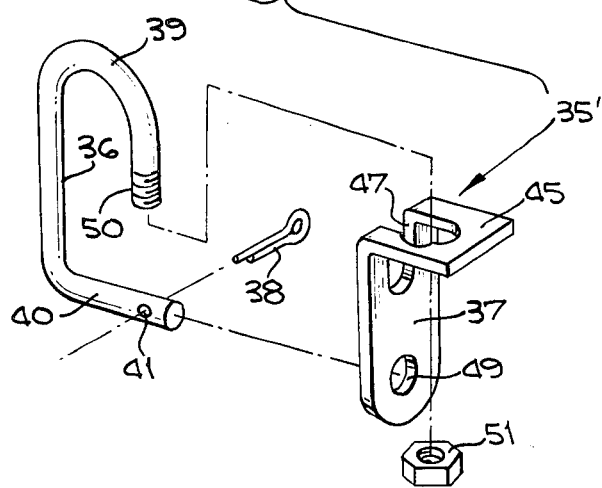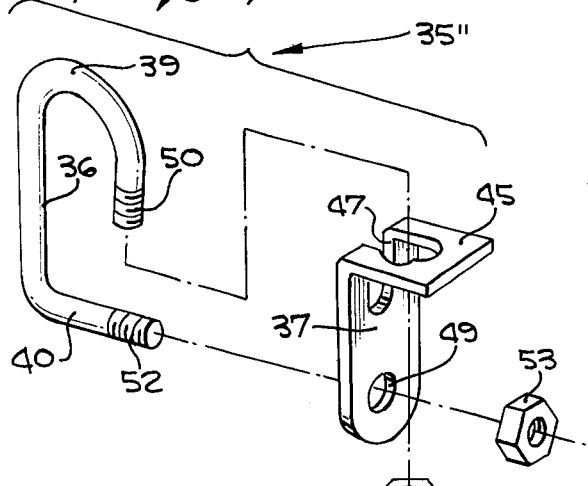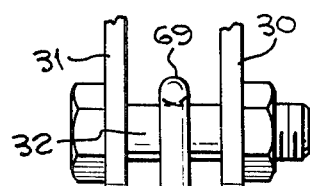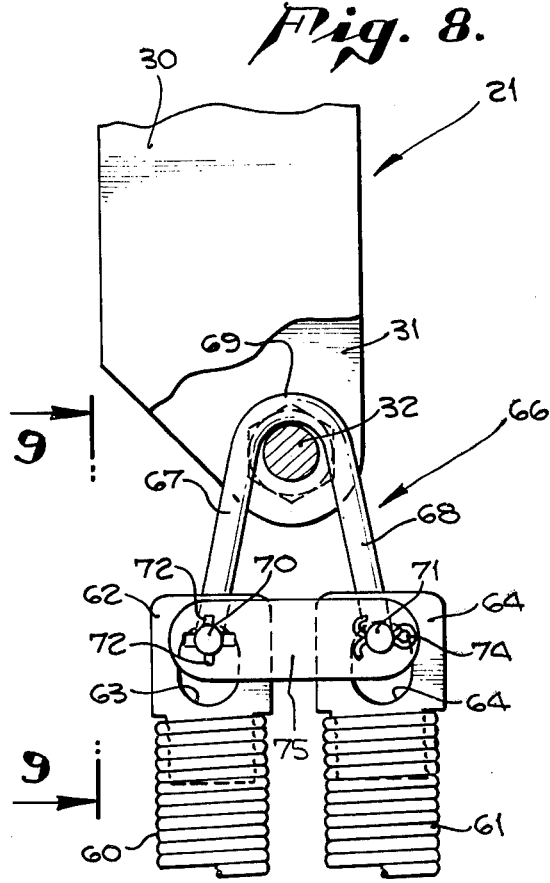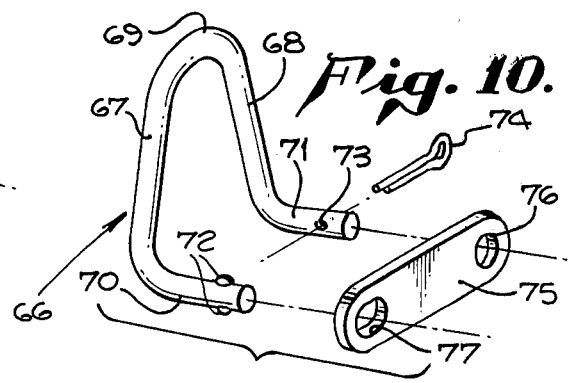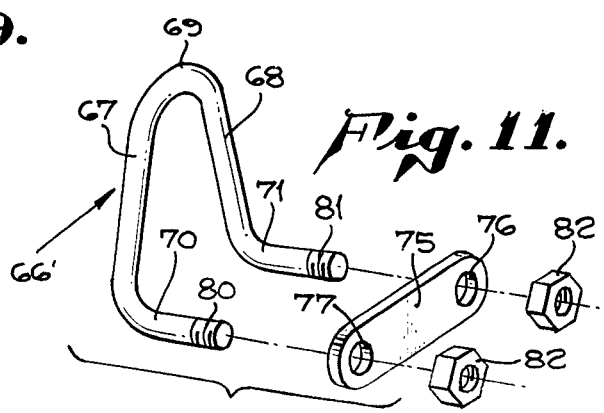

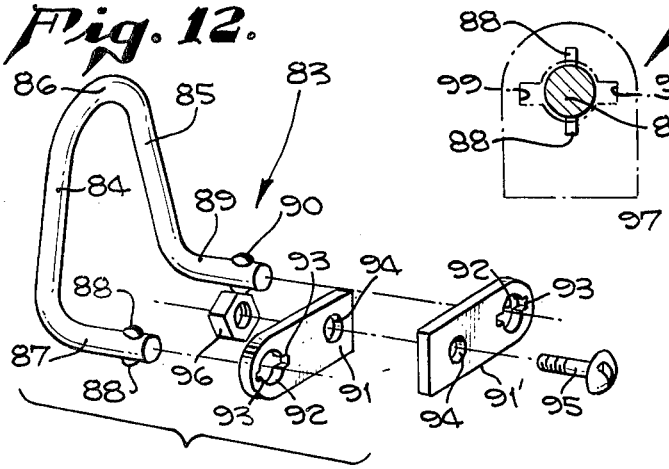
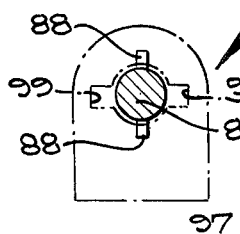
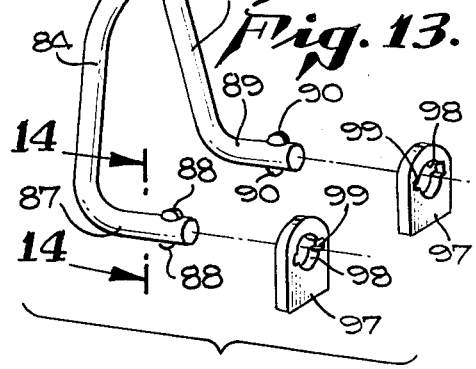
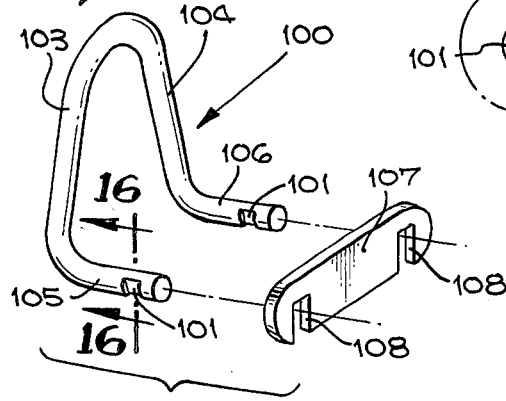
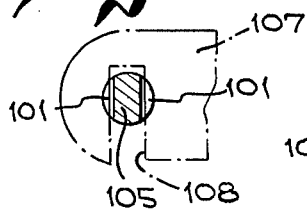
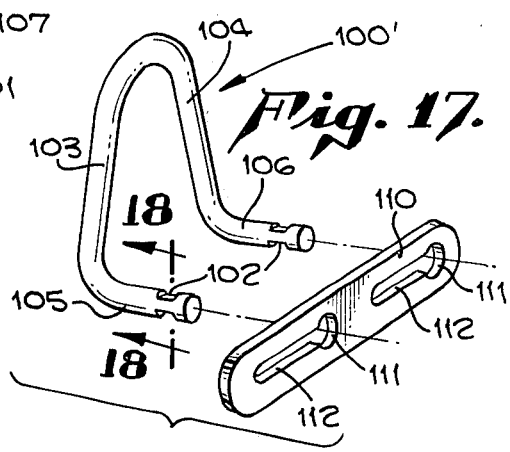
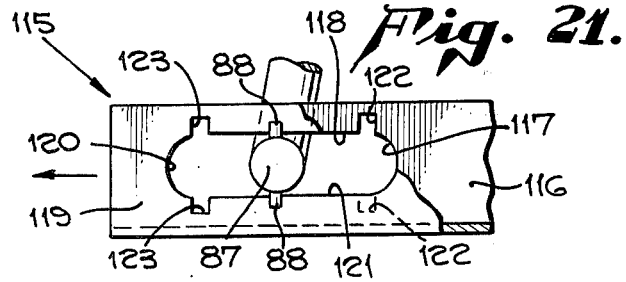
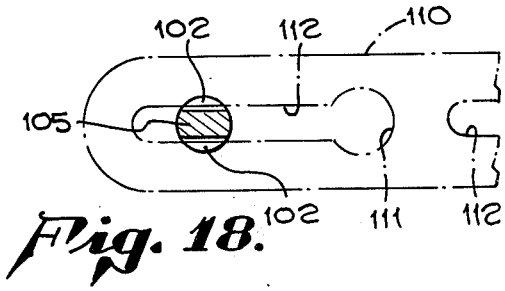
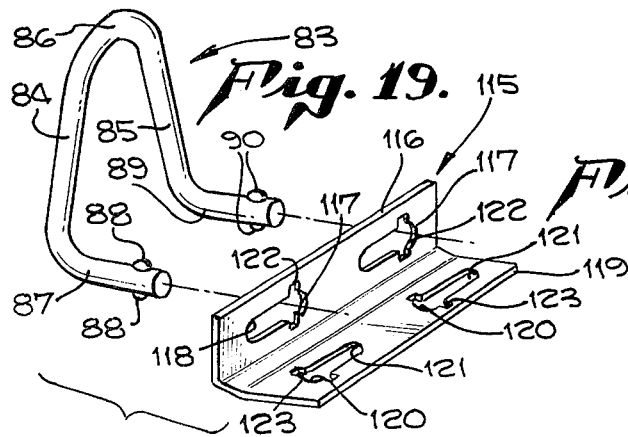
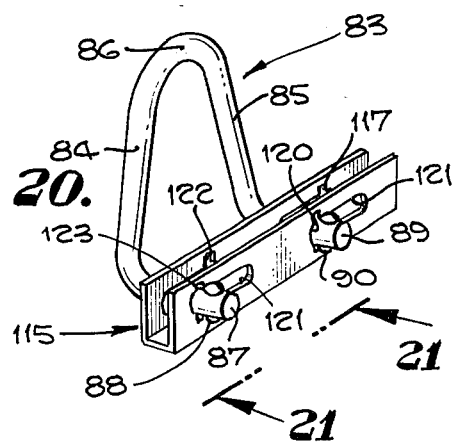

ATTACHMENT FOR GARAGE DOOR SPRING

For counterbalance garage door hardware the type which has become popular during the past decade, certain aspects of the equipment continues to present problems. One of these is the retention of fragmented ends of springs in case of rupture. Another is ease of installation whether by a skilled mechanic or by a house holder when a spring needs to be replaced.

Dependable retention devices have been devised and put in use. Some of these are of such character that they can be applied with ease only by use of special equipment, or in any event by mechanics skilled in the technique of handling hardware of this kind. A problem which is always present especially for the house holder resides in the fact that even though the counterbalance spring when replaced is attached in collapsed condition of the spring, nevertheless some slight initial tension must be applied to the spring so that it is in firm taut position when collasped. Springs for two car garage door hardware, whether single springs or springs in tandem require an extremely heavy pull and rarely can the initial tension be applied without extra special effort on the part of the installer. Under such circumstances the attachment device needs to be particularly simple so that it can be quickly applied and attached while the spring is under slight tension and before it is released.

It is therefore among the objects of the invention to provide a new and improved attachment device for counterbalance coil springs employed on overhead garage door hardware which is dependably secure once it has been put in place and which at the same time is of such construction that the securing expedient is capable of being applied easily.

Another object of the invention is to provide a new and improved attachment for garage door counterbalance springs which is of simple rugged construction such that it is dependable once in place but at the same time one which can be manufactured and sold relatively inexpensively.

Another object of the invention is to provide a new and improved attachment for counterbalance garage door coil springs the basic nature of which is such that it can be readily employed in one form for a single spring attachment and in another slightly different form for springs attached in tandem.

Still another object of the invention is to provide a new and improved attachment for counterbalance garage door coil springs which consists of relatively few parts of rugged character arranged in such fashion that they can be quickly slipped into place in only the proper orientation thereby to permit a final retaining piece to be interlocked with an initially applied piece in such fashion that it will not be dislodged during continued long periods of use.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 1 is an elevational view showing a typical installation of the counterbalance coil spring for an overhead garage door.

FIG. 2 is a fragmentary elevational view on the line 2 — 2 of FIG. 1, showing one of the forms of attachment in place.

FIG. 3 is a fragmentary longitudinal sectional view on the line 3 — 3 of FIG. 2.

FIG. 4 is a cross-sectional view on the line 4 — 4 of FIG. 3.

FIG. 5 is a perspective exploded view of the parts comprising the attachment of FIGS. 2, 3, and 4.

FIG. 6 is a perspective exploded view of a slightly modified form of single spring attachment device.

FIG. 7 is a perspective exploded view of still another form of the single spring attachment device.

FIG. 8 is a fragmentary elevational view of one form of attachment device for springs in tandem.

FIG. 9 is a fragmentary longitudinal view on the line 9 — 9 of FIG. 8.

FIG. 10 is a perspective exploded view of the parts of the device of FIGS. 8 and 9.

FIG. 11 is a perspective exploded view somewhat similar to FIG. 10 but showing a modified form of retention for the retaining piece.

FIG. 12 is a perspective exploded view of another form of device for tandem springs.

FIG. 13 is a perspective exploded view of a form of the device similar to FIG. 12 but showing a slightly different retention structure.

FIG. 14 is a cross-sectonal view on the line 14 — 14 of FIG. 13.

FIG. 15 is a perspective exploded view of a tandem attachment device for a slip on type of retention piece.

FIG. 16 is a cross-sectional view on the line 16 — 16 of FIG. 15.

FIG. 17 is a perspective exploded view of a tandem type attachment with a different slip on type retention piece.

FIG. 18 is a cross-sectional view on the line 18 — 18 of FIG. 17.

FIG. 19 is a perspective exploded view of a tandem type attachment showing the first step in application of a special retention piece.

FIG. 20 is a perspective view showing the next step in attachment of the retention piece of FIG. 19.

FIG. 21 is a fragmentary elevational view on the line 21 — 21 of FIG. 20.

In one embodiment of the invention there is shown by way of environment in FIG. 1 a portion of building structure exemplified by a jamb post 10 for the door for supporting a door panel 11 in swinging position so that it is yieldably supported in the open overhead position in a manner permitting it to swing downwardly to a closed position (not shown). Door hardware of this type includes a plate 12 fastened to the jamb post and an angle strip 13 fastened to the door panel 11. A control lever 14 had one end pivotally attached to the plate 12 by means of a pivot pin 15. The other end of the control lever is pivotally attached by means of pivot pin 16 to a bracket 17 in turn mounted on the angle strip 13.

A booster lever 18 is pivotally secured as a first class lever by means of a pivot pin 19 to the plate 12. At its upper end the booster lever is attached to the angle strip 13 by means of a pivot pin 20. At the lower end of the booster lever is a kick plate assembly indicated generally by the reference character 21 on which is hung a counterbalance spring assembly 22. A coil spring 23 of the counterbalance spring assembly has its upper end attached to the kick plate assembly 21 and its lower end attached by means of a connection 35 and chain 24 to the jamb post 12. A spring plug 28 at the bottom of the spring 23 is attached to the corresponding connection 35. A similar spring plug 26 at the lower end of the spring is attached to the lower connection 35.

A kick plate assembly 21, as shown in FIGS. 2 and 3, in the present embodiment consists of side plates 30 and 31 through which extends a bolt 32.

An attachment device indicated generally by the reference character 35 for a single spring mounting consists in the main of a single length 36 of rod, a retention piece 37 and a cotter pin 38. The rod has a bent hook-like section 39 which is adapted to engage over the bolt 32. At its lower end there is a horizontally extending shoulder section 40 provided at its outer end with a hole 41. The extremity of the hook-like section is provided with a pair of lugs 42 formed from the material of the rod.

The retention piece is specially formed with an angularly bent leg 45 forming a corner 46. An aperture 47 at the corner has a portion extending into the leg 45 and a portion into the retention piece 37 itself. In the portion accommodated by the leg 45 is a lateral recess 48. At the other end of the retention piece 37 is a hole 49.

In the application of the attachment device of FIG. 5 the hook-like section 39 is hung over the bolt 32 and the shoulder section 40 extended through the hole 29 of the plug 28. After this has been accomplished the leg 45 is applied over the end of the hook-like portion 39 in a position oriented such that one of the lugs 42 passes through the lateral recess 48. The retention piece is then rotated slightly interlocking the lugs against the underside of the leg 45 and the shoulder section is then projected through the hole 49 after which the cotter pin 38 is projected through the hole 41 and the ends bent in the customary fashion to secure it in place.

In the form of invention of FIG. 6 the attachment device 35' differs slightly in that the end of the hook-like section 39 is provided with threads 50 to accommodate a nut 51, instead of employment of the lugs 42. In the form of device of FIG. 7 namely the attachment device 35" threads 52 and a nut 53 at the end of the shoulder section 40 replace the cotter pin 38 of the attachment devices 35 and 35'.

The form of device of FIGS. 8 through 21 inclusive accommodates springs 60 and 61 mounted in tandem as shown specifically in FIG. 8. The spring 60 is provided with a customary plug 62 having a hole 63 extending through it. A plug 64 having a hole 65 accommodates the spring 61. In the form of attachment device 66 of FIGS. 8, 9, and 10 the rod has two legs 67 and 68 curved or looped one with respect to the other to form a hook section 69. The free end of the leg 67 is bent at substantially right angles to form a shoulder section 70. The other leg 68 is similarly bent to form a shoulder section 71. The shoulder sections differ only to the extent that lugs 72 are pressed from the metal of the shoulder section 70 whereas a cotter pin hole 73 accommodates the shoulder section 71 for reception of a cotter pin 74.

A retention piece 75 has a hole 76 which fits over the shoulder section 71 and an elongated hole 77 which fits over the shoulder section 70. The hole 77 is elongated in a direction at right angle to the lugs 72 so that the piece 75 can be passed over the lugs 72 and after being rotated 90° the lugs 72 lock the piece in place. When this form of the device is installed the hook section 69 is suspended over the bolt 32 of the kick plate assembly 21. The shoulder sections 70 and 71 are then inserted into the respective holes 63 and 65 in the plugs 62 and 64 as shown in FIG. 8. The retention piece 75 is then applied by inserting the shoulder section 70 through the hole 77 with the lugs 72 in alignment with the elongated hole 77. The retention piece is then rotated 90° until the hole 76 aligns with the shoulder section 71 and applied, after which the cotter pin is positioned as shown in FIG. 8.

In the retention device 66' of FIG. 11 threads 80 and 81 replace respectively the lugs 72 and cotter pin hole 73 of FIG. 10, for accommodation of nuts 82.

A further variation is shown for the attachment device 83 of FIG. 12 and 83' of FIG. 13. In each instance legs 84 and 85 are curved to provide a hook-like section 86. A right angularly disposed shoulder section 87 is provided with lugs 88 and a similar shoulder section 89 is provided with lugs 90. In this form of device the retention piece consists of separate retention piece, elements 91 and 91'. These are identical in that one end of each is provided with a hole 92 having diametrically opposite recesses 93 for accommodation of the lugs 88 or lugs 90 as the case may be. At the other end is a hole 94. The recesses 93 are in an orientation such that after the retention piece elements are applied over the respective shoulder sections 87 and 89, they are rotated 90° so that the lugs prevent removal and in that rotated section the holes 94 are in alignment and accommodate a bolt 95 held in place by a nut 96. Thus assembled the retention piece elements are secure in holding the springs in place.

The retention piece elements 97 of FIGS. 13 and 14 having similar holes 98 with diametrically opposed recesses 99 are merely shorter and after application in one direction and rotation 90° to a suspended direction as shown in FIG. 14, are merely permitted to hold the position by action of gravity.

The attachment devices 100 and 100' of FIGS. 15, 16, and 17 are substantially the same except for orientation of notches 101 in FIG. 15 and notches 102 in FIG. 17. The legs 103 and 104 are bent the same as in the heretofore described forms of device for tandem springs, and shoulder sections 105 and 106 are provided with the spaced pair of notches 101. A retention piece 107 has a slot 108 at each end. The slots are applied over the notches 101 as shown in FIG. 16.

In the form of device of FIG. 17 the spaced parallel notches 102 are in horizontal orientation. In this instance a retention piece 110 has two key hole slots, one at each end, comprising a circular aperture 111 and an elongated aperture 112. When the retention piece is applied to the shoulder sections 105 and 106 free ends of the shoulder sections are inserted through the respective circular apertures 111 after which the retention piece is shifted in a direction from left to right as shown in FIGS. 17 and 18 until the sides of the elongated apertures 112 engage in the notches 102.

In the form of device of FIGS. 19 to 21 the same attachment device 83 is made use of as was described in connection with FIG. 12. A special retention piece 115 is made use of which is shown in initial position in FIG. 19 and in final position in FIG. 20. One leaf 116 of the retention piece 115 has key hole slots with a circular aperture 117 on the right and elongated aperture 118 on the left. In a second leaf 119 key hole slots have a circular aperture 120 on the left and an elongated aperture 121 on the right. The key hole slots are offset longitudinally one which respect to the other.

When the retention piece is to be applied the shoulder sections 87 and 88 are first projected through the circular apertures 117 of the leaf 115 with diametrically opposed recesses 122 accommodating the respective lugs 88 and 90. The leaf 116 is then shifted longitudinally or endwise until the shoulder section 87 is in alignment with the left hand circular aperture 120 and the shoulder section 88 is in alignment with the right hand circular aperture 120. After this has been accomplished the leaf 119 is bent to the position of FIG. 20 and the shoulder section 87 and 88 extended through the respective circular apertures 120 with recesses 123 accommodating the respective lugs 88 and 90. With this having been accomplished the retention piece can then be shifted in a direction from right to left as shown in FIG. 20 or to approximately the position of FIG. 21, in which the retention piece 115 is secure.

Having described the invention, what is claimed as new in support of Letters Patent is as follows:

1. An attachment device for making a secure connection between an attachment element at one end of a counterbalance coil spring and an attachment element on a hanger,
    said attachment device comprising a length of rod,
    a shoulder configuration at a first end of said rod for reception of one of said attachment elements and a hook configuration at one portion of the rod for engagement with another of said attachment elements,
    a retention section comprising a substantially flat band having legs angularly disposed relative to each other forming a corner, said legs each having aperture means therethrough engaging over respective ends of the rod, one of said aperture means comprising a slot extending into both of said legs at the corner and providing a counter shoulder configuration for engagement with the hook configuration on said rod, and mutually interlocking means respectively on said retention piece and said ends of the rod whereby to secure the respective attachment element in place and the leg of said retainer engaging the hook position having its free end facing the same direction as the first end of said rod.

2. An attachment means as in claim 1 wherein the mutually interlocking means comprises configurations at the ends of the rod engagable with an adjacent face of the retention section.

3. An attachment means as in claim 2 wherein one of the configurations is a projection formed of the material of said rod and the other of the configurations is an extra piece engagable with said rod.

4. An attachment means as in claim 2 wherein one of the configurations is a projection formed of the material of said rod and said aperture means has an angularly oriented portion providing a rotational interlock with said projection.

5. An attachment means as in claim 1 wherein said retention section is an angularly bent strip having one aperture means at the angularly bent portion and another aperture means at a flat portion of the strip.

6. An attachment device for making a secure connection between an attachment element at one end of a counterbalance coil spring and an attachment element on a hanger,
    said attachment device comprising a length of rod,
    a shoulder configuration at a first end of said rod for reception of one of said attachment elements and a hook configuration at one portion of the rod for engagement with another of said attachment elements,
    a retention section having an aperture means therethrough applicable over said ends of the rod, and mutually interlocking means respectively on said retention piece and said ends of the rod whereby to secure the respective attachment element in place,
    the portion of the rod forming the hook configuration being at a location intermediate the ends and a shoulder configuration on each end of said rod, said rod having a U-shaped portion with diverging legs lying in one plane to form said hook configuration and having their ends bent at substantially right angles and lying parallel to each other in a second plane substantially at right angles to the first plane.

7. An attachment means as in claim 6 wherein the mutually interlocking means comprises holes and cotter pins.

8. An attachment means as in claim 6 wherein the mutually interlocking means comprises a projection on one of said ends and a transverse slot forming part of said aperture means comprising a rotational interlock.

9. An attachment means as in claim 6 wherein said retention section comprises two strips in respective interlocked engagement with the two ends of the rod and a releasable connection between said strips.

10. An attachment means as in claim 6 wherein said mutually interlocking means comprises transverse slots at said ends of the rod and corresponding slots in said retention section functioning as said aperture means.

11. An attachment means as in claim 10 wherein the slots in the retention section are key hole slots.

12. An attachment device for making a secure connection between an attachment element at one end of a counterbalance coil spring and an attachment element on a hanger,
    said attachment device comprising a length of rod,
    a shoulder configuration at a first end of said rod for reception of one of said attachment elements and a hook configuration at one portion of the rod for engagement with another of said attachment elements,
    a retention section having an aperture means therethrough applicable over said ends of the rod, and mutually interlocking means respectively on said retention piece and said ends of the rod whereby to secure the respective attachment element in place,
    the portion of the rod forming the hook configuration being at a location intermediate the ends and a shoulder configuration at each end of said rod,
    said retention section comprising sides mutually foldable into parallel positions, one of said sides having key hole slots extending in one longitudinal direction and the other of said sides having longitudinally off-set complementary key hole slots extending in the opposite longitudinal direction.

13. An attachment means as in claim 1 wherein the band is of uniform breadth and thickness and the angular disposition of said legs is at substantially 90°.

14. An attachment means as in claim 13 wherein the end of the rod opposite said first end has a laterally projecting lug for engagement with a respective leg of said retention section.

15. An attachment means as in claim 14 wherein there is a lateral recess in one of said legs at one side of said slot adapted to receive said lug in one angular position of the rod relative to the retention section and to block removal of said lug in other angular positions of the rod relative to the retention section.

* * * * *